(12) United States Patent
Dhalleine et al.

(10) Patent No.: US 9,149,063 B2
(45) Date of Patent: Oct. 6, 2015

(54) METHOD FOR PREPARING ALKALINE HYDROLYSATES OF PLANT PROTEINS

(75) Inventors: Claire Dhalleine, Compiegne (FR); Sophie Delepierre, Quesnoy sur Deule (FR)

(73) Assignee: ROQUETTE FRERES, Lestrem (FR)

( * ) Notice: Subject to any disclaimer, the term of this patent is extended or adjusted under 35 U.S.C. 154(b) by 0 days.

(21) Appl. No.: 13/698,108

(22) PCT Filed: May 16, 2011

(86) PCT No.: PCT/FR2011/051093
§ 371 (c)(1),
(2), (4) Date: Nov. 15, 2012

(87) PCT Pub. No.: WO2011/144856
PCT Pub. Date: Nov. 24, 2011

(65) Prior Publication Data
US 2013/0059928 A1   Mar. 7, 2013

(30) Foreign Application Priority Data
May 20, 2010   (FR) ...................................... 10 53944

(51) Int. Cl.
| | |
|---|---|
| A23J 3/32 | (2006.01) |
| A61K 8/64 | (2006.01) |
| A61K 47/42 | (2006.01) |
| C07K 1/12 | (2006.01) |
| C07K 14/415 | (2006.01) |
| A23L 1/305 | (2006.01) |
| A23J 3/14 | (2006.01) |
| A23L 1/00 | (2006.01) |

(52) U.S. Cl.
CPC ................. *A23L 1/3053* (2013.01); *A23J 3/14* (2013.01); *A23J 3/32* (2013.01); *A23L 1/0029* (2013.01)

(58) Field of Classification Search
None
See application file for complete search history.

(56) References Cited

U.S. PATENT DOCUMENTS

| | | | |
|---|---|---|---|
| 2,522,050 A | 8/1946 | Lenderink | |
| 2,999,753 A | 9/1961 | Witwicka et al. | |
| 3,397,991 A | 8/1968 | Johnson | |
| 5,274,079 A | 12/1993 | Katayama et al. | |
| 2003/0175407 A1* | 9/2003 | Kunst et al. ................ | 426/665 |

FOREIGN PATENT DOCUMENTS

| | | |
|---|---|---|
| EP | 1 327 390 | 7/2003 |
| EP | 1 909 592 | 2/2007 |
| GB | 670 413 | 4/1952 |
| GB | 705 489 | 3/1954 |
| WO | 95/25437 | 9/1995 |
| WO | 20071079458 | 7/2007 |
| WO | 20081001183 | 1/2008 |
| WO | 20081110515 | 9/2008 |

OTHER PUBLICATIONS

Wang et al. J Agric Food Chem. 53:9186-9192;2005.*
Barac et al. Int J Mol Sci. 11:4973-4990;2010.*
Sijtsma et al. Nahrung. 42:215-216;1998.*
Aluko et al. J Agric Food Chem. 57:9793-9800;2009.*
International Search Report dated Aug. 25, 2011, corresponding to PCT/FR2011/051093.
Buckee, et al.; Determination of Total Nitrogen in Barley, Malt and Beer by Kjeldahl Procedures and the Dumas Combustion Method-Collaborative Trial; Mar.-Apr. 1994, vol. 100, pp. 57-64.

* cited by examiner

*Primary Examiner* — Amber D Steele
*Assistant Examiner* — Schuyler Milton
(74) *Attorney, Agent, or Firm* — Young & Thompson

(57) ABSTRACT

A method for preparing alkaline hydrolysates of plant proteins, which includes the following steps: 1) preparing a suspension of proteins selected from the group consisting of pea proteins, potato proteins and maize proteins, at a dry matter content of between 10 and 15%; 2) adjusting the pH, with stirring, to a value between 9.5 and 10.5 using, as the only alkaline agent, one or more alkali metal hydroxides selected from the group consisting of sodium hydroxide and potassium hydroxide; 3) heating the resulting suspension at a temperature between 70 and 80° C., for 4 to 6 hours; 4) neutralizing said heated suspension using an inorganic acid, preferably hydrochloric acid; 5) drying the neutralized suspension so as to obtain the alkaline hydrolysate.

12 Claims, No Drawings

METHOD FOR PREPARING ALKALINE HYDROLYSATES OF PLANT PROTEINS

FIELD OF THE INVENTION

The present invention relates to a method for preparing alkaline hydrolysates of plant proteins.

The present invention also relates to alkaline hydrolysates of plant proteins, characterized by their solubility at pH 7.5, their average length of peptide chain, their emulsifying power at pH 7 and their richness.

BACKGROUND OF THE INVENTION

Plant or animal proteins and hydrolysates of plant or animal proteins are often used as foaming agents in food products, notably in confectionery:

proteins as such, chosen as foaming agents that are stable over time, protein hydrolysates, for their higher foaming capacity than for proteins.

Numerous documents describe the foaming properties of protein hydrolysates. The most recent documents discuss the enzymatic hydrolysis of proteins, whereas earlier works describe the alkaline hydrolysis of proteins.

For example, alkaline hydrolysates of milk proteins have been described for their use in extinguisher foams or as substitutes for egg proteins in aerated food products.

U.S. Pat. No. 2,522,050 describes a method for manufacturing foaming agents by alkaline hydrolysis of a soybean protein or milk protein in an aqueous solution containing calcium hydroxide or magnesium hydroxide at a pH of at least 10 and at a temperature said to be well below 100° C. (35-40° C.) for a long period (at least two days) in order to obtain a product having satisfactory foaming properties.

Thus, it should be noted that this document recommends:

selecting reaction temperatures less than or equal to 40° C., giving preference to hydroxides of calcium or of magnesium, and especially hydroxides of calcium in order to obtain hydrolysates of proteins displaying the best foaming properties, giving preference to long reaction times.

Thus, patent GB 670,413 describes a method for preparing foaming agents by hydrolysis of proteins at room temperature for a period of at least 24 hours, hydrolysis being performed using a calcium hydroxide.

It is also mentioned in this patent that, although it is possible to hydrolyze proteins at a higher temperature, of the order of 100° C. and higher, this will be to the detriment of the desired foaming properties.

However, although hydrolysis with calcium hydroxide is often recommended, the hydrolysates produced have a very bad taste, which is a serious handicap. Generally they are in fact chalky and bitter, and moreover have a sulfury and rubbery taste.

Raising the temperature during hydrolysis with calcium hydroxide can reduce the reaction time, but increases the formation of these undesirable flavors.

To take account of all these requirements, patent EP 1,327,390 therefore proposes a method for aerating a food product containing carbohydrates using a hydrolysate of plant protein as foaming agent, said hydrolysate being obtained by subjecting the plant protein to hydrolysis in an aqueous solution with a pH of at least 10.

This alkaline hydrolysate then has an average length of peptide chain from 5 to 20 amino acids and an amount of free amino acids less than 15 wt % of the total matter derived from proteins.

However, to achieve this result, the original method of alkaline hydrolysis described in patent EP 1,327,390 requires combining alkali metal hydroxides and alkaline-earth hydroxides, i.e. combining at least one alkali metal hydroxide such as NaOH or KOH with at least one alkaline-earth hydroxide, for example $Ca(OH)_2$ or $Mg(OH)_2$.

Efficient alkaline hydrolysis, according to the terms of said patent EP 1,327,390, therefore can only be obtained by a quite particular manner of carrying out hydrolysis.

International patent application WO 95/25437 describes a method for producing hydrolysates of plant proteins with an improved coloration by extracting the proteins contained in vegetable flours at a pH above the isoelectric pH of the protein, optionally in the presence of adsorbents, and hydrolysis of the protein thus obtained in the presence of adsorbents with alkalis, acids and/or enzymes in a manner described as "known per se".

The protein hydrolysates thus obtained can then be used notably as surfactants.

The method recommended for alkaline hydrolysis in fact consists in treating the aqueous alkaline suspension of the protein isolates once again with calcium oxides or hydroxides.

The solution obtained must then be filtered to remove the residues.

To obtain the peptides as such, the peptides must be treated further in the form of calcium salts with sodium hydroxide or potassium hydroxide, and the residual calcium must then be removed, for example in the form of calcium sulfate.

Separation of the salts with low solubility must finally be carried out in the presence of filter aids on filters and filter-presses.

The hydrolysates thus obtained, after concentration, have an average molecular weight varying from 100 to 30 000 dalton, preferably 100 to 10 000 dalton and especially from 2000 to 5000 dalton and a dry matter content from 5 to 50 wt %.

Patent EP 1,909,592 describes a method for producing protein hydrolysates enriched in manganese, intended in animal husbandry as controlled sources of supply of manganese, thus making it possible to avoid overdosage in the animal's diet, and to reduce all phenomena of interference with other dietary components.

To obtain these manganese-rich protein hydrolysates, treatment, for example with lime in certain conditions of pressure and temperature, of connective tissues derived from skin treated in a tannery had already been described in the prior art.

Patent EP 1,909,592 instead proposes obtaining protein hydrolysates enriched in manganese by using, as starting material, a conventional vegetable organic matter, and notably subjecting it to a treatment with lime.

Manganese enrichment of these proteins is then carried out by treating the calcium salts of the protein hydrolysates with manganese sulfates or other manganese salts at high temperatures, dissolved beforehand in sulfuric acid solutions.

It is further necessary to precipitate the residual calcium salts with ammonium bicarbonate, sodium bicarbonate or directly with carbon dioxide and/or other precipitants, for example oxalic acid and phosphoric acid.

International patent application WO 2008/001183 describes foodstuffs in the form of sticks, crackers or extruded products, rich in protein hydrolysates of animal or plant origin, with addition of or mixed with an excipient or a food-grade diluent.

These hydrolysates of plant or animal proteins have a protein content greater than or equal to 60 wt %.

The hydrolysates are produced starting from plant proteins, animal proteins or proteins from fermentation.

They are peptides or polypeptides, predominantly soluble in water in a pH range from 3 to 11.

The hydrolysates according to application WO 2008/001183 are preferably produced by the action of proteolytic enzymes.

The molecular weight of the hydrolysis products is between 200 and 100 000 dalton with a preference for molecular weights between 200 and 20 000 dalton.

Patent application WO 2007/079458 proposes substituting proteins for fats and carbohydrates. However, in their native form, proteins have physical and organoleptic properties that give them a very bad taste.

To make proteins more attractive as substitutes for fats, the native proteins are hydrolyzed to peptides and polypeptides, mainly by means of enzymes of the protease type.

These protein fragments are more soluble in water. They can then be incorporated in drinks (obtaining so-called "protein-concentrated" drinks), or added to solid foods to give them a less chalky taste.

However, enzymatic hydrolysis of native proteins has a major drawback: the protein hydrolysates are still very bitter and not all of them are thermally stable.

To reduce the bitterness, many solutions have been proposed, but are still rather unsatisfactory.

For example, prolonging the hydrolysis of the proteins has been tried, so as to obtain very short peptides, dipeptides, or even free amino acids.

Intensive hydrolysis of the proteins can reduce the bitterness significantly, but leads to "soapy" tastes. Moreover, the bitter and chalky aftertaste persists even after hydrolysis.

It is then recommended in application WO 2007/079458 to return to the more traditional method of alkaline hydrolysis, but to couple it with a reaction of enzymatic hydrolysis.

This double hydrolysis reaction then results in short peptide chains being obtained.

The method described in this application in fact consists in preparing a solution of proteins, adjusting the solution pH to a value of 10.4 or more to form a basic solution of proteins, and adding thereto a protease.

The protein hydrolysates thus obtained then have a very low molecular weight, on average from 2000 to 10 000 dalton.

These compositions can be thermally stable at a temperature of at least 87.8° C. (190° F.) for at least 5 minutes, and have reduced bitterness.

As for patent application WO 2008/110515, it describes a composition of partially hydrolyzed cereal proteins.

These protein hydrolysates then have between 20 and 80 wt % of partially hydrolyzed proteins of at most 25 000 dalton and of the order of 8 wt % of partially hydrolyzed proteins of at most 1400 dalton.

This particular weight distribution, i.e. a relatively high molecular weight fraction, endows these partial hydrolysates of cereal proteins with properties comparable to milk proteins, with fewer drawbacks than the milk proteins.

Moreover, such a partially hydrolyzed cereal protein has a pleasant texture in the mouth and is easily digestible.

However, the base material is preferably vital wheat gluten, and the process requires fine control of enzymatic hydrolysis so as to achieve a degree of hydrolysis of from 3 to 8.

This partial hydrolysis is usually carried out in the presence of one or more exo- and endopeptidase enzymes.

Finally, document GB 705 489 describes the hydrolysis of peanut proteins by sodium hydroxide, at 82° C. for 30 minutes; neutralization with HCl and the obtaining of "swelling" hydrolysates, whereas document U.S. Pat. No. 2,999,753 discloses alkaline hydrolysates of plant proteins obtained after treatment at 37-80° C. (100-175° F.) for 8 to 20 hours at a pH of 10.7-10.8.

SUMMARY OF THE INVENTION

It follows from the foregoing that there is still a need for hydrolysates of pea, potato and corn proteins that have excellent solubility, a molecular weight distribution and a degree of hydrolysis allowing them to display excellent emulsifying power and also good organoleptic properties.

Moreover, it must be possible to produce these hydrolysates by a method that is inexpensive and simple to implement, in other words economically and industrially viable.

The invention therefore has the aim of overcoming the drawbacks of the hydrolysates and methods of the prior art, and the applicant company was able to find, after much research, that this aim could be achieved by proposing a particular method for preparing alkaline hydrolysates of plant proteins.

This method for preparing alkaline hydrolysates of plant proteins according to the invention comprises the following steps:

1) preparing a suspension of plant proteins selected from the group consisting of pea proteins, potato proteins and corn proteins, with a dry matter content between 10 and 15%, 2) adjusting the pH, with stirring, to a value between 9.5 and 10.5 using, as the only alkaline agent, one or more alkali metal hydroxides selected from the group consisting of sodium hydroxide and potassium hydroxide, 3) heating the suspension thus obtained at a temperature between 70 and 80° C., for 4 to 6 hours, 4) neutralizing said heated suspension by means of a mineral acid, preferably hydrochloric acid, 5) drying the neutralized suspension to obtain the alkaline hydrolysate.

The first step of the method for obtaining alkaline hydrolysates according to the invention consists in preparing a suspension of plant proteins with a dry matter content ("DM" hereinafter) between 10 and 15%.

The second step of the method for obtaining alkaline hydrolysates according to the invention consists of adjusting the pH of the suspension of plant proteins having from 10 to 15% of DM, with stirring, to a value between 9.5 and 10.5, preferably to a value of 10.0, with sodium hydroxide or potassium hydroxide.

Adjustment of the reaction mixture to a pH of the order of 10 (which may for example involve a supply of sodium hydroxide of the order of 1.2% dry weight/dry weight of pea proteins) makes it possible to obtain products displaying the best behavior in terms of solubility and emulsifying capacity ("EC" hereinafter).

The applicant company found, moreover, that these values of solubility and of EC do not show any significant further variation after 6 hours of reaction.

As for the basicity, it is provided solely by hydroxides of alkali metals, preferably sodium hydroxide (NaOH) or potassium hydroxide (KOH).

Therefore hydroxides of alkaline-earth metals, such as calcium hydroxide, will not be used.

The third step of the method consists in heating the suspension at a temperature between 70 and 80° C., for 4 to 6 hours.

After testing from 55 to 90° C., the reaction temperature was finally selected at a value between 70 and 80° C., preferably of the order of 75° C.

As for the reaction time, it is fixed between 4 and 6 hours.

By proceeding in this manner, the applicant company goes against the prejudices of the prior art, in the sense that:

the reaction time is very short, easily industrializable: therefore it is no longer necessary to carry out the reaction for 24 to 48 hours, or even more, it is not proposed to use hydroxides of calcium or of magnesium. On the contrary, the applicant company found that the use of lime impacted negatively on the quality of the protein hydrolysates obtained.

The fourth step of the method for obtaining alkaline hydrolysates according to the invention consists in neutralizing the pH by means of a mineral acid, preferably hydrochloric acid.

For example, 1N hydrochloric acid is added to the mixture, with stirring, in order to adjust the pH to 7.

The fifth step of the method for obtaining alkaline hydrolysates according to the invention consists in drying the alkaline hydrolysate thus obtained.

For example, the product is dried in a turbine spray dryer of the NIRO type with co-current operation. This spray dryer does not have a fines recycling system; it is therefore a single-stage drying. The air entering the spraying tower is heated to 180° C. The feed rate for the tower is adjusted so that the air at tower outlet is at a temperature of the order of 80 to 85° C. These spraying conditions lead to a powder having 6 to 7% of residual moisture.

By employing the method according to the invention, it is possible to obtain alkaline hydrolysates of plant proteins displaying remarkable functional characteristics.

These alkaline hydrolysates of plant proteins are thus characterized by:

a value of water solubility at pH 7.5 between 60 and 100%, preferably between 80 and 98%, an emulsifying capacity between 60 and 90%, preferably 65 and 85%, an average length of peptide chain between 10 and 20 amino acids, a richness between 60 and 95%, preferably between 80 and 85%.

DETAILED DESCRIPTION OF THE INVENTION

The alkaline hydrolysates according to the invention are characterized by their solubility, determined by a test A.

This test A consists in determining the content of water-soluble matter at pH 7.5 by a method of dispersion of a test sample in distilled water and analysis of the supernatant obtained after centrifugation.

Thus, it can notably be carried out as follows. A test sample of exactly 2 g and a magnetized bar (for example with the reference No. ECN 442-4510 from the company VWR) are put in a 400-ml beaker. The tare of the whole is found, then 100 g of distilled water at 20° C.±2° C. is added.

The pH is adjusted to 7.5 with 1N HCl or 1N NaOH and it is made up to exactly 200 g with distilled water.

It is stirred for 30 minutes and then centrifuged for 15 minutes at 3000 g.

After centrifugation, exactly 25 g of supernatant is taken in a previously calibrated crystallizing dish. It is held in a stove at 103° C. to constant weight.

The water solubility is calculated from the following equation:

$$\text{Solubility} = \frac{(w1 - w2) \times 200 \times 100}{25 \times 2}$$

with w1=weight in g of the crystallizing dish after drying
w2=weight in g of the empty crystallizing dish The alkaline hydrolysates according to the invention therefore have a solubility between 60 and 100%, preferably between 80 and 98%.

The alkaline hydrolysates according to the invention are also characterized by their emulsifying capacity, determined according to a test B.

This test consists in determining the Emulsifying Capacity ("EC" hereinafter) corresponding to the percentage of stable emulsion "cream" formed after centrifugation as a function of a certain concentration of proteins and of oil, using a homogenizer, such as that of the POLYTRON brand and of type PT 45-80 (preferably equipped with an Easy-clean spindle reference B99582/company Bioblock).

More precisely, this test comprises the following:

In a tall 2-liter pot (i.e. for example with a height of 23.5 cm and diameter of 11.5 cm), prepare a solution of alkaline protein hydrolysates equivalent to 2.0% of proteins (weight/volume of proteins N×6.25) in 250 ml of demineralized water.

Introduce a magnetized bar (notably under reference No. ECN 442-4510 from the company VWR).

Mix the alkaline protein hydrolysates for 10 minutes on a magnetic stirrer, for example of brand IKA® RCT Classic, at a maximum speed of 1100 rev/min.

Prepare 250 ml of food-grade colza oil.

Remove the magnetized bar.

Immerse the spindle of the homogenizer in the solution, to mid-height of the solution of alkaline protein hydrolysates.

Set the rotary speed between 15 200 and 15 450 rev/min.

Switch on the stirrer and pour in the 250 ml of colza oil in 1 minute.

Transfer the emulsion to a beaker.

Weigh twice exactly 35 g of the emulsion into two 50-ml graduated centrifuge tubes.

Centrifuge at 1500 g for 5 minutes, at 20° C.

Measure the volume of the emulsion "cream" after centrifugation.

Measure the total volume after centrifugation (pellet+water+emulsion cream).

Check the repeatability between the 2 tubes and between 2 identical tests.

The Emulsifying Capacity will be determined by calculation, using the following equation:

$$EC = \frac{\text{Volume of emulsion cream after centrifugation}}{\text{Total volume after centrifugation}} \times 100$$

The alkaline hydrolysates according to the invention have a value of EC between 60 and 90%, preferably between 65 and 85%.

The alkaline hydrolysates according to the invention are also characterized by their average length of peptide chain, determined according to a test C.

This test C consists in calculating the average chain length as follows, where
TN=total nitrogen
TAN=total amino nitrogen FAA=free amino acids
F=average nitrogen content of the amino acids of the protein in question
ALPC=average length of peptide chains
PAA=number of peptide amino acids
PC=number of peptide chains TN is then determined according to the method of Dumas A., 1826, Annales de chimie, 33, 342, as cited by BUCKEE, 1994, in Journal of the Institute of BREWING, 100, pp 57-64, a method known by a person skilled in the art, and expressed in mmol/g.

TAN is determined by "Sorensen" formol titration, also known by a person skilled in the art, and expressed in mmol/g.

FAA is determined by HPLC and expressed in mmol/g.

Depending on the proteins in question, the value of F (expressed in mol/mol) is as follows:
pea proteins: 1.29
potato proteins: 1.25
corn proteins: 1.24

The average chain length is equal to the number of peptide amino acids divided by the number of peptide chains, i.e.:

$$ALPC = \frac{PAA}{PC}$$

with $PAA = \left(\frac{TN}{F}\right) - FAA$ and $PC = TAN - F \times FAA$

The alkaline hydrolysates according to the invention therefore have an average length of peptide chain between 10 and amino acids, which reflects the partially hydrolyzed character of the proteins.

Finally, the alkaline hydrolysates according to the invention are characterized by their richness (expressed in N×6.25), which can be determined by a method that is well known by a person skilled in the art.

The alkaline protein hydrolysates according to the invention are also characterized by:
their organoleptic quality,
their foaming capacity (hereinafter: "FC"), and
their degree of hydrolysis.

The organoleptic quality of the alkaline hydrolysates according to the invention was determined notably on alkaline hydrolysates of pea proteins.

The alkaline hydrolysates of pea proteins according to the invention in fact have an entirely satisfactory organoleptic quality, compared with the pea proteins from which they are prepared.

As will be described in the examples given below, a sensory profile are obtained by the applicant company in the following way: samples were prepared in colored glass vials at a rate of 5 g of product in 150 g of water and held at 50° C., they are then presented blind to the panelists.

The panelists must then smell and taste the product and check the boxes corresponding to the descriptors.

This profile shows that the flavor of the alkaline hydrolysates of the invention is different than the pea proteins.

According to the panel of experts, whether based on the olfactory criterion or on the gustatory criterion, the descriptors "pea", but also "sour", "bitter", "acrid", "pungent", and "fermented" of the hydrolysates are attenuated relative to those of the pea proteins.

The foaming capacity is, for its part, determined according to test D as follows.

A foam is a dispersion of gas (nitrogen, carbon dioxide, air) bubbles in a liquid or solid continuous phase (containing proteins or their hydrolysates) produced by mechanical agitation.

A solution of 40 ml at 2% (weight/volume of proteins N×6.25) of the protein hydrolysates is prepared with demineralized water in a tall 250-ml beaker (i.e. having for example a height of 12 cm and a diameter of 6 cm).

A magnetized bar is introduced (notably under reference No. ECN 442-4510 from the company VWR).

The protein hydrolysates are hydrated for 10 minutes on a magnetic stirrer, such as that of brand IKA® RCT Classic, at a speed of 1100 rev/min.

The magnetized bar is removed.

The total volume before swelling is measured.

The spindle (for example reference G45M) of a homogenizer, such as that of brand IKA® Werke of the type ULTRA TURRAX® T50 basic, is immersed in the solution of protein hydrolysates to mid-height of said solution.

The rotary speed is set at about 15 200 rev/min (i.e. on position "5" in the case of the ULTRA TURRAX), and stirring is carried out for 1 minute.

The whole volume is transferred to a 100-ml graduated cylinder.

The total volume after swelling is measured.

The foaming capacity is then found from the following formula:

$$FC = \frac{\text{Total volume of foam after swelling}}{\text{Total volume before swelling}} \times 100$$

The loss of stability is expressed by the loss of foam volume after 30 minutes, expressed as a percentage of the initial volume of foam.

The alkaline hydrolysates according to the invention then have a value of FC between 150 and 250%.

Moreover, these alkaline hydrolysates have a degree of hydrolysis (DH) advantageously between 5 and 9. The latter can be determined by calculation, from the following formula:

$$DH = [(TAN \%) \times 100]/[\text{protein nitrogen}] \text{ where:}$$

TAN is the total amino nitrogen determined by "Sorensen" formol titration, known by a person skilled in the art, and expressed in mmol/g, the protein nitrogen is expressed as N×6.25, and measured by the method that is well known by a person skilled in the art.

The alkaline hydrolysates according to the invention can be used advantageously as emulsifiers in the sectors of human or animal food industries, the pharmaceutical industry, the cosmetics industry and chemical industries, in particular in the food sector.

They can also be used in the industries of fermentation, building materials, plastics, textiles, paper and cardboard.

Finally, the present invention relates to compositions, preferably food compositions, containing the alkaline hydrolysates as described above.

These food compositions are preferably emulsions emulsified with said alkaline hydrolysates.

Other features and advantages of the invention will become clear on reading the nonlimiting examples described below.

EXAMPLES

Example 1

Preparation of Pea Protein Hydrolysates

The alkaline hydrolysates of pea proteins according to the invention are prepared as follows:
1) suspend 25 kg of proteins at 93% of DM, i.e. 23.15 kg of DM, in 210 kg of water,
2) adjust the pH to 10 with sodium hydroxide, and heat the resultant suspension at a temperature of 75° C., for 4 hours,
3) neutralize to pH=7 with 1N hydrochloric acid,
4) spray-dry the alkaline hydrolysate thus obtained.

The product is dried in a turbine spray dryer of the NIRO type with co-current operation. This spray dryer does not have a fines recycling system; it is therefore single-stage drying. The air entering the spraying tower is heated to 180° C. The feed rate for the tower is controlled so that the air at tower outlet is at a temperature of the order of 80 to 85° C.

These spray-drying conditions lead to production of a powder having a residual moisture of the order of 6%.

The results obtained are shown in table I below:

TABLE I

| | Native protein before hydrolysis | Hydrolysate according to the invention |
|---|---|---|
| Dry matter (%) | 92.4 | 94.1 |
| Solubility pH 7.5 (%) | 70.1 | 93.0 |
| EC (%) | 67.0 | 80.0 |
| Average length of peptide chain | 16 | 14 |
| Degree of hydrolysis | 4.9 | 5.6 |
| Richness (%) | 85.2 | 81.2 |
| FC (% increase in volume after swelling relative to the initial volume) | 183 | 225 |

The hydrolyzed pea proteins according to the invention have an average length of peptide chain of 14.

Hydrolysis of the pea proteins according to the invention makes it possible to increase:
the solubility from 70.1 to 93%,
the emulsifying capacity from 67 to 80%.
Moreover, the foaming power is improved.

The pea protein hydrolysates according to the invention display properties of solubility, and emulsifying and foaming capacities which are better than the properties of the same proteins before hydrolysis.

Example 2

Hydrolysis of Very Rich Pea Proteins

The procedure described in example 1 is applied to pea proteins having a protein content above 90%.

These operating conditions produce a powder having the following characteristics (table II):

TABLE II

| | Native protein before hydrolysis | Hydrolysate according to the invention |
|---|---|---|
| Dry matter (%) | 94.8 | 94.1 |
| Solubility pH 7.5 (%) | 32 | 79.2 |
| EC pH 7 | 75 | 81 |
| Average length of peptide chain | 19 | 13 |

TABLE II-continued

| | Native protein before hydrolysis | Hydrolysate according to the invention |
|---|---|---|
| Degree of hydrolysis | 4 | 6 |
| Richness (%) | 92.2 | 89.6 |

The pea proteins having a richness above 90% when hydrolyzed according to the invention have an average length of peptide chain of 13.

Hydrolysis of the pea proteins according to the invention makes it possible to increase:
the solubility from 32 to 79.2%,
the emulsifying capacity from 75 to 81%.

Example 3

Preparation of Potato Protein Hydrolysates

The procedure described in example 1 is applied to potato proteins.

These operating conditions produce a powder having the following characteristics (table III):

TABLE III

| | Native protein before hydrolysis | Hydrolysate according to the invention |
|---|---|---|
| Dry matter (%) | 91.6 | 92.7 |
| Solubility pH 7.5 (%) | 31.0 | 85.2 |
| EC pH 7 (%) | 60 | 67 |
| Average length of peptide chain | 13 | 13 |
| Degree of hydrolysis | 6.2 | 8.0 |
| Richness (%) | 70.7 | 65.3 |

Surprisingly and unexpectedly, it is therefore seen that alkaline hydrolysis, without affecting the average length of peptide chain (value equal to 13 in both cases), nevertheless leads to a hydrolysate with much better solubility and improved emulsifying capacity.

Hydrolysis of the potato proteins according to the invention makes it possible to increase
the solubility from 31.0 to 85.2%,
the emulsifying capacity from 60 to 67%.

Example 4

Preparation of Corn Protein Hydrolysates

The procedure described in example 1 is applied to corn proteins. These operating conditions produce a powder having the following characteristics (table IV):

TABLE IV

| | Native protein before hydrolysis | Hydrolysate according to the invention |
|---|---|---|
| Dry matter (%) | 95.1 | 91.4 |
| Solubility pH 7.5 (%) | 5.1 | 97.4 |
| EC pH 7 (%) | 0 | 67 |
| Average length of peptide chain | 59 | 16 |
| Degree of hydrolysis | 1.4 | 5.9 |
| Richness (%) | 86.5 | 81 |
| FC (% increase in volume after swelling relative to the initial volume) | 0 | 250 |

The hydrolyzed corn proteins according to the invention have an average length of peptide chain of 16.

Hydrolysis of the corn proteins according to the invention makes it possible to increase:
the solubility from 5.1 to 97.4%,
the emulsifying capacity from 0 to 67%.

Moreover, the native corn proteins do not have any foaming power whereas the hydrolyzed corn proteins according to the invention have remarkable foaming capacities.

The corn protein hydrolysates according to the invention make it possible to improve the properties of solubility, and emulsifying and especially foaming capacities.

Example 5

Comparative Table of Various Hydrolysates of Plant Proteins According to the Invention

TABLE V

|  | Botanical origin of the hydrolyzed proteins | | |
|---|---|---|---|
|  | Pea | Potato | Corn |
| Richness (%) | 81.2 | 65.3 | 81 |
| Degree of hydrolysis | 5.6 | 8.0 | 8.4 |
| Average length of peptide chain | 14 | 13 | 16 |
| % solubility | 93.0 | 85.2 | 97.4 |
| EC (%) | 80.0 | 67.0 | 67.0 |
| FC: % increase in volume after swelling | 225 | 150 | 250 |

Regardless of the botanical origin of the proteins (pea, potato, corn), hydrolysis according to the invention makes it possible to obtain proteins having:
a average length of peptide chain between 10 and 20 amino acids,
a solubility from 85.2 to 97.4%,
an emulsifying capacity from 67 to 80%,
a foaming capacity, defined by the percentage increase in volume after swelling, from 150 to 250%.

Example 6

Use of the Hydrolysates According to the Invention for the Encapsulation of Oils Fish oil is encapsulated by spraying an emulsion at 45% of DM and at pH=8.

The oil represents 15% of the dry matter, with the encapsulation carrier and emulsifier varying depending on the formulas.

The emulsion is produced according to the following procedure:

Dissolve the encapsulation carrier and the emulsifier in demineralized water heated to 80° C. (=encapsulating solution)

Adjust the pH to 8 with 1N NaOH

Stir for 20 minutes

Weigh out the oil 5 minutes before the end of this period to avoid oxidation

Make the emulsion using a POLYTRON homogenizer of type PT 45-80 (equipped with an Easy-clean spindle with the reference B99582 from Bioblock), speed of 9000 rpm: for this, pour the oil into the encapsulating solution (prepared in steps 1 and 2), stirring for 2 minutes.

Transfer the emulsion obtained to a high-pressure homogenizer at 160 bar (30 bar in the 2nd stage and supplementing to 160 bar for the first stage)

Then stir the emulsion, keeping the temperature close to 50° C.

The emulsion thus prepared is sprayed in a single-stage spray dryer (without recycling of the fine particles). The temperature of the incoming air is 185° C.; the flow rate is controlled to give T° outlet=90° C.

The powders obtained are characterized by their water content, activity of water (aw), the degree of encapsulation and by the oxidation state of the oil.

The degree of encapsulation is measured by the difference between total fats and extractable fats (amount of oil fixed by the carrier):

$$\text{degree of encapsulation}(\%) = 100 - \left[\frac{\%\text{ extractable lipids}}{\%\text{ total lipids}}\right] \times 100$$

The lipids are determined by Soxhlet extraction with hexane:
on the product as it is for the extractable lipids,
on the product after hydrolysis for the total lipids.

The oxidation stability is determined according to standard NF ISO 6886.

The induction time corresponds to the time taken to oxidize a fat in given conditions (temperature, air flow rate, weight of product).

Example 6.1

Spraying of emulsions at 45% of DM and pH=8 containing:
15% of fish oil,
1.2 or 1.8% of emulsifier: native pea protein/pea protein hydrolysate from example 1,
respectively 83.5% or 83.2% of carrier: maltodextrin of DE 12 (GLUCIDEX® 12 marketed by the company ROQUETTE FRERES).

The sprayed powders have an activity of water of 0.1.

Their water content is 5% for the tests with 1.2% of emulsifier and 4% for the tests with 1.8% of emulsifier.

Table VI: degree of encapsulation (%) and induction time (h) of the emulsions sprayed with maltodextrin of DE 12

TABLE VI

| Nature and content of emulsifier | Degree of encapsulation (%) | Induction time (h) |
|---|---|---|
| 1.2% Native pea proteins | 78.3 | 6.0 |
| 1.2% Pea protein hydrolysates according to the invention | 87.9 | 8.5 |
| 1.8% Native pea proteins | 83.2 | 6.7 |
| 1.8% Pea protein hydrolysates according to the invention | 90.0 | 11.0 |

With the maltodextrin carrier of DE 12, using the pea protein hydrolysate according to the invention at a level of 1.2% makes it possible to encapsulate up to 87.9% of oil versus 78.3% with the native pea protein.

The oil then has an induction time of 8.5 h versus 6 h.

For both concentrations of emulsifier, the degree of encapsulation is greater when using the pea protein hydrolysate according to the invention rather than the native pea protein.

Likewise, the induction time is greater when using the pea protein hydrolysate according to the invention rather than the native pea protein.

Therefore the oil oxidizes less quickly.

Example 6.2

Spraying of emulsions at 45% of DM and pH=8 containing:

15% of oil 1.2 or 1.8% of emulsifier: native pea protein/pea protein hydrolysate according to the invention respectively 83.8% or 83.2% of carrier: pea dextrin (TACKIDEX® C760 marketed by the company ROQUETTE FRERES).

The sprayed powders have an activity of water of 0.1.

The water contents are comparable for a given content of emulsifier.

Table VII: degree of encapsulation (%) and induction time (h) of the emulsions sprayed with pea dextrin

TABLE VII

| Nature and content of emulsifier | Water content | Degree of encapsulation (%) | Induction time (h) |
| --- | --- | --- | --- |
| 1.2% Native pea proteins | 4.6 | 62.0 | 6.1 |
| 1.2% Pea protein hydrolysates according to the invention | 4.2 | 82.9 | 7.7 |
| 1.8% Native pea proteins | 3.6 | 48.0 | 6.0 |
| 1.8% Pea protein hydrolysates according to the invention | 4.0 | 88.9 | 8.5 |

With pea dextrins as encapsulation carrier and regardless of the content of emulsifier, the degree of encapsulation is greater when using the pea protein hydrolysate according to the invention rather than the native pea protein.

Likewise, the induction time is greater when using the pea protein hydrolysate according to the invention rather than the native pea protein.

The use of the pea protein hydrolysate according to the invention as emulsifier makes it possible to increase the degree of encapsulation in comparison with the native pea protein.

Moreover, the use of the pea protein hydrolysate according to the invention makes it possible to increase the induction time of the oils.

In other words, the oils are better protected against oxidation when the emulsion is made with the pea protein hydrolysate according to the invention rather than with the native pea protein.

Example 7

Production of Refatted Whey Permeates

The quantities of whey available in the world are considerable since they represent at least 85% of the milk transformed into cheese.

There are many possible uses of whey in human food and animal feed but the current tendency is for fractionation of whey.

In particular, whey protein concentrates are particularly suitable for use in infant foods.

The proteins are separated from the whey by ultrafiltration, resulting in large volumes of whey permeates mainly containing lactose, minerals and small soluble proteins.

The challenge is to exploit this deproteinized soluble fraction.

It is therefore proposed to re-enrich the soluble fraction resulting from the ultrafiltration of whey:

with fats, to a level more or less equivalent to that of cow's milk, and with proteins, for nutritional and functional purposes, the latter for stabilizing the emulsion formed.

Finally, this mixture is dried to facilitate storage. The powders are mainly used in suckling feeds for calves.

Therefore, the capacity of pea protein hydrolysates for advantageously replacing proteins in this application is tested.

For this, the following are selected:

a native pea protein, a pea protein hydrolysate according to the invention (that from example 1).

The suspensions are prepared at 60% of DM, of which 40% of fats and 16% of proteins relative to the formula without fats.

The formulas are prepared in the following way: water is heated and maintained at 50° C. in a double-jacketed vat.

The whey permeate is added, as is the protein source.

The pH of the mixture is then corrected to 7 with sodium hydroxide.

The liquid fat is then added.

The mixture is homogenized in a two-stage high-pressure homogenizer, the first stage is set at 20 bar and the second stage at 80 bar.

The product is then dried in a spraying tower of the NIRO type with nozzles and without recycling of fines.

The spraying conditions are the same for the two formulas: the temperature of the incoming air is 165° C., that of the outgoing air is 94° C.

The spraying pressure is of the order of 175 bar. The temperature of the incoming air on the fixed bed is 85° C.

The content of extractable lipids and of total lipids is determined by an assay method with hexane with Soxhlet extraction.

The ratio of extractable lipids to total lipids is an indicator of the efficiency of the emulsifier: the lower the level of extractable lipids and therefore the lower the ratio, the better the emulsion, which allows us to predict good stability of the final resuspended product. This aspect is fundamental for the palatability rating of the product.

In addition, the powders are characterized by a flow test, which consists in calculating the time for flow of a powder in a funnel with the dimensions used in the pharmacopeial test (test 2.9.16 of the European Pharmacopeia 6.0).

More precisely, the test consists in:

fixing said funnel at a height of 20 cm, blocking the tip of the funnel, filling the funnel with 100 g of powder, unblocking the tip and starting the timer, stopping the timer when all the powder has flowed out, noting the flow time on the timer.

The results obtained are presented in table VIII below:

TABLE VIII

| Nature of the emulsifier | % DM of the powder | % total lipids | % extractable lipids | Ratio EL/TL (%) | Flow test (s) |
|---|---|---|---|---|---|
| Native pea protein | 99.0 | 42.9 | 26.2 | 61 | No flow |
| Pea protein hydrolysate according to the invention | 98.6 | 41.9 | 6.3 | 15 | 14 |

Example 8

Sensory Analysis

A sensory profile was obtained by the applicant company in the following way: samples are prepared in colored glass vials at a rate of 5 g of product in 150 g of water and held at 50° C., and then they are presented blind to the panelists.

The 10 panelists who took part in the test were asked to smell and taste the product and then check the descriptor or descriptors corresponding to each sample according to the proposed categories of descriptors.

The results are presented below in table IX.

TABLE IX

| Descriptors | Native protein before hydrolysis | Pea protein hydrolysate according to the invention |
|---|---|---|
| Olfactory criterion: percentage citation of descriptors | | |
| Earth - concrete - dust | 30% | 20% |
| Straw - cereals | 0% | 10% |
| Starch - paper - flour - starch powder - cardboard | 30% | 10% |
| Potato | 10% | 10% |
| Pea - gluten - proteins | 40% | 10% |
| Sour - bitter - acrid - pungent - fermented | 60% | 50% |
| Gustatory criterion: percentage of citation of descriptors | | |
| Earth - concrete - dust | 10% | 10% |
| Straw - cereals | 10% | 20% |
| Starch - paper - flour - starch powder - cardboard | 50% | 70% |
| Potato | 0% | 0% |
| Pea - gluten - proteins | 70% | 20% |
| Sour - bitter - acrid - pungent - fermented | 40% | 20% |

This profile shows that the flavor of the alkaline hydrolysates of the invention is different than the pea proteins.

According to the panel of experts, whether based on the olfactory criterion or the gustatory criterion, the descriptors "pea", but also "sour", "bitter", "acrid", "pungent", and "fermented" of the hydrolysates are attenuated relative to those of the native pea proteins.

Example 9 (Comparative)

Preparation of Hydrolysates of Plant Proteins According to Other Methods

Example 9-1

Hydrolysates of pea, potato and corn proteins were prepared following the procedure given as an example in document GB 705 489, comprising the successive steps of:
1) preparing a protein solution at 10-15% of dry matter (10% for pea protein, 13% for potato and corn proteins),
2) adding 25 ml of 40% NaOH,
3) heating for 30 minutes at 82° C.,
4) neutralizing to pH=7 with HCl,
5) heating for 2 minutes at 82° C.,
6) lyophilization.

The results obtained are presented in table X below:

TABLE X

| | According to the invention | Comparative test | | |
|---|---|---|---|---|
| | | Pea | Potato | Corn |
| Richness | 60-95 | 77.6 | 51 | 64.4 |
| Solubility/dry | 60-100 | 99.5 | 83.3 | 65.5 |
| Degree of hydrolysis | 5-8.5* | 4 | 7 | 2 |
| Emulsifying capacity | 60-90 | 86.7 | 76 | 66.7 |
| Chain length | 10-20 | 21 | 20 | 54 |

*see table V above

The method according to GB 705 489 therefore does not make it possible to obtain hydrolysates of plant proteins possessing the good compromise of properties desired according to the invention.

Example 9-2

Hydrolysates of pea, potato and corn proteins were prepared following the procedure given as an example in document U.S. Pat. No. 2,999,753, comprising the successive steps of:
1) preparing a protein solution at 10-15% of dry matter (10% for pea protein, 12% for potato and corn proteins),
2) adjusting the pH to 10.7 with NaOH,
3) heating for 20 h at 40° C.,
4) neutralizing to pH=5.5 with HCl,
5) lyophilization.

The results obtained are presented in table XI below:

TABLE XI

| | According to the invention | Comparative test | | |
|---|---|---|---|---|
| | | Pea | Potato | Corn |
| Richness | 60-95 | 79.9 | 54.4 | 66.9 |
| Solubility/dry | 60-100 | 28.95 | 35.1 | 17.7 |
| Degree of hydrolysis | 5-8.5* | 1 | 4 | 1 |
| Emulsifying capacity | 60-90 | 57.3 | 60 | 58.3 |
| Chain length | 10-20 | 102 | 87 | 160 |

*see Table V above

The method according to U.S. Pat. No. 2,999,753 therefore does not make it possible to obtain hydrolysates of plant proteins possessing the good compromise of properties desired according to the invention.

The invention claimed is:
1. Alkaline hydrolysates of plant proteins obtained by the following method:
   preparing a suspension of plant proteins selected from the group consisting of pea proteins, potato proteins and corn proteins, the plant proteins having a dry matter content between 10% and 15%;
   adjusting the pH of the suspension, with stirring, to a value between 9.5 and 10.5 using, as the only alkaline agent, one or more of sodium hydroxide and potassium hydroxide;
   heating the pH adjusted suspension at a temperature between 70° C. and 80° C., for 4 to 6 hours;

neutralizing the pH of said heated suspension using a mineral acid; and drying the neutralized suspension to obtain the alkaline hydrolysate of plant proteins, wherein the hydrolysate has:
- a water solubility value at pH 7.5 between 80% and 98%,
- an emulsifying capacity between 60% and 90%,
- an average peptide chain length between 10 and 20 amino acids, and
- a richness (N×6.25) between 60% and 95%.

2. The hydrolysates as claimed in claim 1, wherein the hydrolysates have a foaming capacity between 150% and 250%.

3. A method of emulsifying a composition, comprising adding as emulsifiers the hydrolysates of claim 1 to the composition.

4. A food composition, comprising the alkaline hydrolysates as claimed in claim 1.

5. The food composition as claimed in claim 4, wherein the composition is an emulsion emulsified by said alkaline hydrolysates.

6. The method as claimed in claim 3, wherein the hydrolysates have a foaming capacity between 150% and 250%.

7. The food composition as claimed in claim 4, wherein the hydrolysates have a foaming capacity between 150% and 250%.

8. The food composition as claimed in claim 7, wherein the composition is an emulsion emulsified by said alkaline hydrolysates.

9. The alkaline hydrolysate as claimed in claim 1, wherein the mineral acid is hydrochloric acid.

10. The alkaline hydrolysate as claimed in claim 1, wherein the hydrolysate has an emulsifying capacity between 65% and 85%.

11. The alkaline hydrolysate as claimed in claim 1, wherein the hydrolysate has a richness between 80% and 85%.

12. The method as claimed in claim 3, wherein the composition is in a sector of human or animal food industries, pharmaceutical industry, cosmetics industry or chemical industry.

* * * * *